United States Patent
Astle

[19]

[11] Patent Number: 6,026,190
[45] Date of Patent: Feb. 15, 2000

[54] IMAGE SIGNAL ENCODING WITH VARIABLE LOW-PASS FILTER

[75] Inventor: Brian Astle, Phoenix, Ariz.

[73] Assignee: Intel Corporation, Santa Clara, Calif.

[21] Appl. No.: 08/332,523

[22] Filed: Oct. 31, 1994

[51] Int. Cl.[7] .................................................. G06K 9/36
[52] U.S. Cl. .......................................... 382/232; 382/239
[58] Field of Search ................................. 382/238, 239, 382/232; 348/419, 405; 358/261.2

[56] References Cited

U.S. PATENT DOCUMENTS

| | | | |
|---|---|---|---|
| 4,047,221 | 9/1977 | Yasuda et al. | 348/419 |
| 4,366,471 | 12/1982 | Kasuga | 340/347 |
| 4,706,260 | 11/1987 | Fedele et al. | 382/238 |
| 4,940,977 | 7/1990 | Mandell | 341/143 |
| 5,038,209 | 8/1991 | Hang | 348/419 |
| 5,107,345 | 4/1992 | Lee | 358/432 |
| 5,287,420 | 2/1994 | Barrett | 382/233 |
| 5,412,484 | 5/1995 | Yoshikawa | 348/419 |
| 5,442,401 | 8/1995 | Murakami et al. | 348/419 |
| 5,463,603 | 10/1995 | Petersen | 369/48 |
| 5,475,433 | 12/1995 | Jeong | 348/419 |
| 5,543,848 | 8/1996 | Murakami et al. | 348/416 |
| 5,552,832 | 9/1996 | Astle | 348/420 |

*Primary Examiner*—Yon J. Couso
*Attorney, Agent, or Firm*—William H. Murray; N. Stephan Kinsella

[57] ABSTRACT

A computer-implemented method and apparatus for encoding image signals. According to a preferred embodiment, an image signal is received. A strength S of a variable low-pass filter having a variable strength is selected. The low-pass filter means is applied at strength S to the image signal. The filtered image signal is encoded to provide an encoded bitstream representative of the current image signal.

25 Claims, 4 Drawing Sheets

ENCODING SYSTEM

FIGURE 1. ENCODING SYSTEM

FIGURE 2. DECODING SYSTEM

IMAGE SIGNAL ENCODING WITH VARIABLE LOW-PASS FILTER

BACKGROUND OF THE INVENTION

1. Field of the Invention

The present invention relates to signal processing, and, in particular, to computer-implemented methods and apparatuses for real-time encoding of image signals using low-pass filters.

2. Description of the Related Art

This invention relates to signal encoding which is often used to compress video image signals. These images may be still images, or they may be part of a plurality of successive frames of video data ("video frames") that represent a motion video. The encoded bitstream representing a compressed image may be stored in a mass storage device in its compressed format in order to conserve storage space. When the compressed image is later retrieved it may be decompressed and, for example, displayed on a monitor.

The encoded bitstream may also be transmitted to one or more remote signal processing systems such as video conferencing nodes. These video conferencing nodes may be personal computer ("PC") based systems communicating with each other over a selected transmission medium. Because transmission media have finite bandwidths, in order to provide video conferencing of satisfactory quality, each PC system preferably compresses in satisfactory quality, each PC system preferably compresses in real time the video signals corresponding to the local participant and transmits the resulting compressed signals or bitstreams to the PC systems of the remote participants. Each PC system also preferably receives and decompresses compressed signals from the PC systems of the remote participants to play the decompressed video signals locally.

Such encoding operations that compress video image signals typically operate on subsets of the image, such as (8×8) blocks of pixels. A higher amount of compression tends to lower the number of bits needed to represent the image, but also tends to diminish the quality of the image reconstructed by the decoder. In limited bandwidth environments, as described above, a limited number of bits may be transmitted (or stored), on average, per image. Often, for example where a plurality of video frames are to be successively transmitted, there is a need to compress each image so that the average bitstream per image may be transmitted using the available bandwidth. If the images are not compressed enough then not all images may be transmitted using the available bandwidth, or might not be able to be stored as preferred in a mass storage device. If, however, some images are compressed more than is necessary, then some of the bandwidth is wasted that could have been used to transmit a higher quality image. Thus, the type and amount of compression may need to be altered for each frame and even for each block within the frame in order to control the bit rate.

Typically, the (8×8) blocks of the image to be encoded are transformed by a forward discrete cosine transform ("DCT") to generate a transformed signal comprising 64 DCT coefficients, which are also arranged in an (8×8) block. One conventional manner of controlling the bit rate of the encoded bitstream is to select varying quantization levels, represented in quantization tables, at the encoding stage. In quantization, each DCT coefficient is divided by the quantizer in the corresponding (8×8) block position in order to reduce the number of bits needed to represent the coefficient. As is appreciated by those skilled in the art, use of a coarser quantization table implies using fewer bits to encode an image but at the cost of image quality. Use of finer quantization tables results in encoded bitstreams with more bits but with higher quality images upon decompression. This type of bit rate control is often referred to as primary bit rate control. Secondary bit rate control involves the dropping of video frames or images from the video stream. The secondary bit rate control is a back-up mode in case the primary bit rate control is insufficient.

Unfortunately, when coarser quantization is used at the encoding stage to control the bit rate, the resulting decoded image often demonstrates quantization artifacts, for example along the edges of the (8×8) blocks that are decoded from the quantized transformed coefficients. One way to minimize such artifacts in the decoded (i.e., decompressed) image is to perform post-filtering on the decoded image at the decoding stage. Post-filtering, however, may severely distort the image or otherwise remove too much information, may demand too much processing time, or may introduce added complexity to the decoder.

It is accordingly an object of this invention to overcome the disadvantages and drawbacks of the known art and to provide computer-implemented methods, apparatuses, and systems for greater control of the bit rate of encoded bitstreams. It is a further object of this invention to provide higher quality decompressed images.

Further objects and advantages of this invention will become apparent from the detailed description of a preferred embodiment which follows.

SUMMARY OF THE INVENTION

The present invention is a computer-implemented method and apparatus for encoding image signals. According to a preferred embodiment, an image signal is received. A strength S of a variable low-pass filter means having a variable strength is selected. The low-pass filter means is applied at strength S to the image signal. The filtered image signal is encoded to provide an encoded bitstream representative of the current image signal.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT

In the present invention, video image signals are compressed in real time based on subimages or blocks of (8×8) pixels to yield an encoded bitstream for each image. The images so compressed may be still images, or they may be part of a plurality of video frames that represent a motion video. Separate video image signals may be often referred to in this application as frames or video frames.

System Hardware

Figure 1:
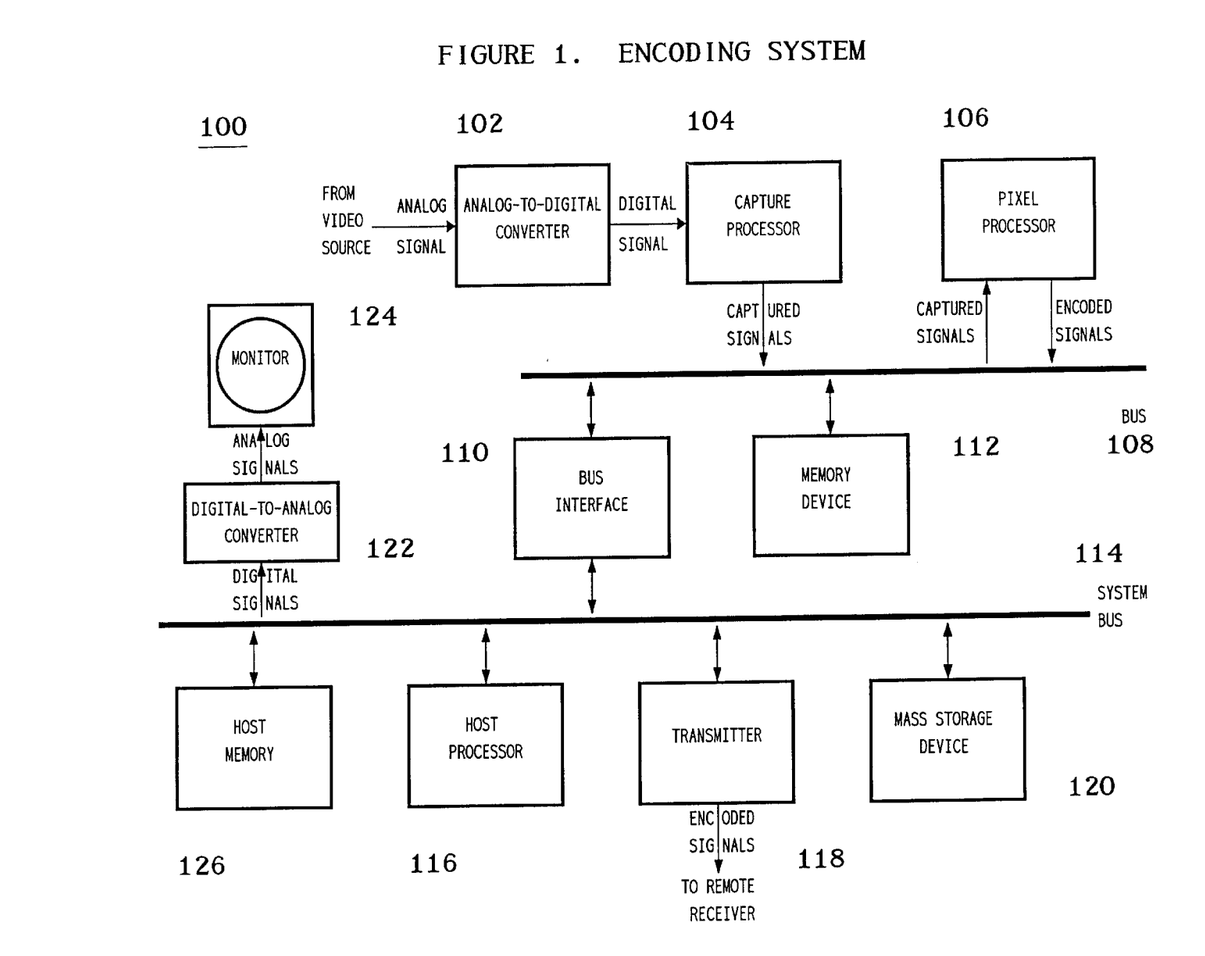
FIG. 1 is a computer-based encoding system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each frame of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
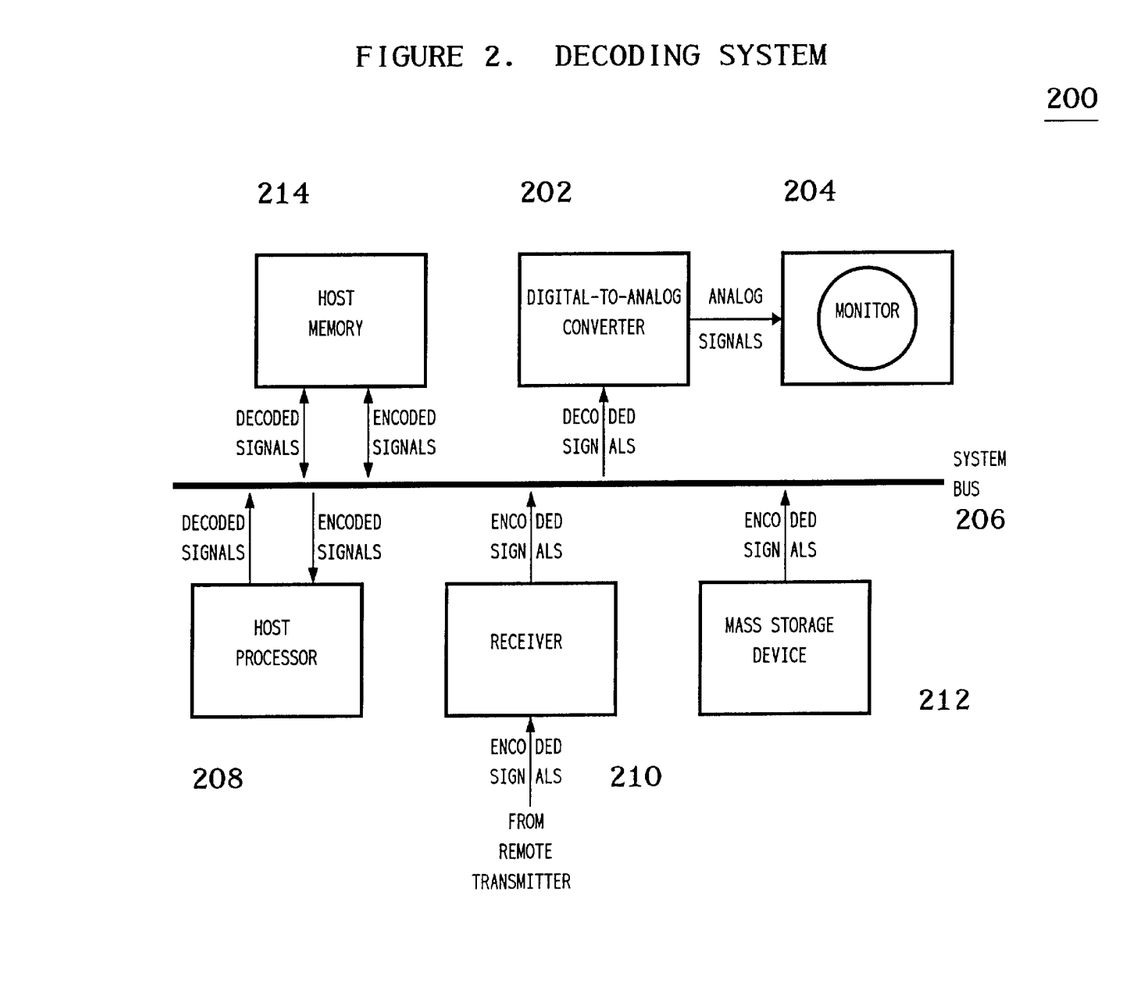
FIG. 2 is a computer-based decoding system for decoding the video signals encoded by the computer system of FIG. 1, according to a preferred embodiment of the present invention.

Referring now the FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled frames. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing.

Encoding Processing

Figure 3:
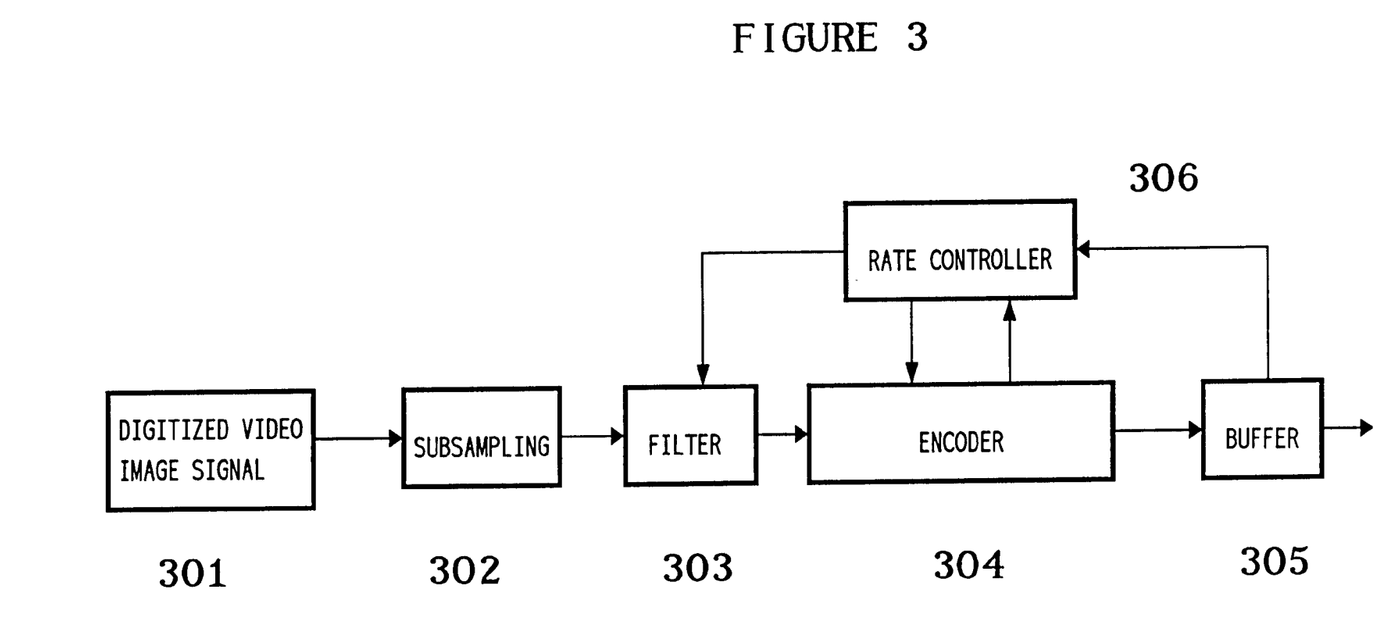
FIG. 3 is a process flow diagram of the encoding processing implemented by the pixel processor of FIG. 1.

Referring now to FIG. 3, there is shown a process flow diagram of the encoding processing implemented by capture processor 104 and pixel processor 106 of FIG. 1, according to a preferred embodiment of the present invention. As shown in FIG. 3, capture processor 104 of FIG. 1 captures and digitizes video image signals to provide a digitized video image signal 301. As described above, video image signal 301 is a single frame of video data, which may be a still image or one of a plurality of video frames that constitute a motion video. Capture processor 104 further performs the subsampling 302 of digitized image 301 to provide a subsampled, digitized video image comprising an array of pixels. At this point the pixel array is broken up into subimages or blocks of (8×8) pixels which are independently encoded further.

Low pass filter 303 under the control of the rate controller 306 is then applied to each (8×8) block. Encoder 304, also under control of rate controller 306, applies a transform such as a DCT to the filtered subimage blocks and quantizes the DCT coefficients, as described in further detail below. Buffer 305 next receives the encoded bitstream representing the quantized DCT coefficients for transmission via the transmission medium to a destination source. It will be understood by those skilled in the art that, in a preferred embodiment, the functional elements of the process flow diagram of FIG. 3 are implemented by capture processor 104 and pixel processor 106 of FIG. 1. Filter 303 may be a separate filter coupled with pixel processor 106. It will further be understood that, in alternative preferred embodiments, pixel processor 106 or capture processor 104 may perform the filtering of filter 303. Those skilled in the art will further appreciate that additional encoding processes may be applied to video image signal 301, at, for example, the encoder 304 stage, such as motion estimation, inter- or intra-frame encoding, and run-length encoding.

In conventional encoding techniques filter 303 is not present in the process flow, and rate controller 306 adjusts the bit rate by varying the quantization levels to be applied to the DCT coefficients of the transformed video image in the following-described manner. Rate controller 306 attempts to produce a targeted bit rate that is optimal for the applicable bandwidth. For instance, if a first encoded video frame yields an encoded bitstream having more bits than the targeted bit rate, or if buffer 305 is becoming full, a coarser (i.e., higher) quantization level may be applied to the next video image in order to reduce the bit rate so that the average bit rate approaches the target bit rate. If the average bit rate is above the targeted bit rate for too long then buffer 305 will overflow and a video image will have to be skipped, i.e. not transmitted, and its information thus lost.

In quantization, each DCT coefficient of the coefficients of a transformed (8×8) block is divided by the quantizer in the corresponding (8×8) block position and then either rounded to the nearest number or the fractional part is truncated. As presented in the Quantization Tables below, in a preferred embodiment, each quantizer of each quantization table is an integer power of two. This allows pixel processor 106 to perform the quantization of encoder 304 by simply shifting the DCT coefficient to the right by the appropriate corresponding integer power. When DCT coefficients are scaled down in this manner by dividing it by a quantizer divisor, many of them become zeros, making them easier to represent with fewer bits, for example by run-length encoding applied to the bitstream after the encoder stage 304.

Each block may be quantized using different quantization tables. The selection of which quantization tables to use, as well as the strength S of filter 303, is part of the bit rate control in the compression processing of the present invention. One method of bit rate control assumes that a single quantization level may be selected for the entire frame.

The selection of quantization level may be based on a characterization of the complexity of the frame (e.g., based on the sum of the absolute values of the DCT coefficients). Knowing the complexity of the previous image or video frame, the quantization level used to encode the previous frame, and the resulting number of bits used to encode the previous frame, the quantization level for the current frame may be selected by comparing the complexity of the current frame to the complexity of the previous frame and taking into account the number of bits used to encode the previous frame relative to the target bit rate.

The goal of such a bit rate control may be to minimize the total mean square error over the entire frame. Such a strategy may be appropriate for encoding video sequences comprising scene changes and where motion may occur in any region of the frame.

However, in a video conferencing usage, for example, scene changes may be rare or even nonexistent and motion tends to be concentrated in particular regions of the images (e.g., the center of the frame containing conference participants), while other regions containing background scenes may change infrequently, if at all. Moreover, the human eye is more sensitive to coding errors in different types of video scenes. For example, the human eye is more sensitive to coding errors in smooth or uniform regions (e.g., plain walls) than in regions of high random detail (e.g., foliage). Similarly, the human eye is more sensitive to coding errors in regions of stationary uniform detail (e.g., striped wallpaper) than in regions of motion (e.g., person moving across a room). As such, overall video quality is improved by using finer quantization to encode those regions to which the human eye is more coding-error sensitive (thereby preserving more detail) than is used for those regions to which the human eye is less coding-error sensitive.

In a preferred embodiment, therefore, as described hereinabove, the video image signals, which comprise video frames in a video conferencing environment, are divided into regions of (8×8) blocks, where each region may be encoded using a different quantization table. Rate controller 306 keeps track of the total number of bits used to encode each region of a frame. Rate controller 306 assumes that each block of the next frame will be encoded using a similar number of bits as for the corresponding region of the previous frame.

The quantization level used to encode each region may be based on a measure of the complexity of the region. Where a region corresponds to a block of the video frame, the complexity measure is preferably a weighted sum of the absolute values of the DCT coefficients for that block, where the weighting emphasizes the high-frequency DCT coefficients over the low-frequency DCT coefficients.

The quantization level Q for the current region of the current frame is preferably selected using Equation (1) as follows:

$$Q = Q_{ave} * \frac{(C_{ave} + R * C)}{(R * C_{ave} + C)}, \quad (1)$$

where C is the complexity of the current region, $C_{ave}$ is the average complexity for the current frame, $Q_{ave}$ is the average quantization level for the current frame, and R is a specified constant (preferably with a value of approximately 2). Such a formula allows the quantization levels to vary from block to block over each frame, where the constant R determines the magnitude of the allowable variation.

The tables range in quantization coarseness from coarse (index 0) to fine (index 15). The tables are designed so that the table having index 8 produces roughly a specified target bit rate for a typical video sequence, table 0 produces less than half of the target bit rate, and table 15 produces more than double the target bit rate.

As will be understood, when a DCT is performed on an (8×8) block of an image, the 64 coefficients are arranged in zig-zag fashion from the upper left corner of an (8×8) block down to the lower right corner. When arranged this way, the upper left corner of a block of DCT coefficients contain the DC component and lower frequency coefficients of the transformed block, while the lower right corner contains the higher frequency components of the transformed block. Larger quantization divisors are grouped in the lower right regions of the Tables, while smaller divisors are grouped in the upper left region of the Tables. In this manner higher frequency coefficients tend to be divided by higher divisors than the DC component and lower frequency components. The reason for this weighting is that loss of information in the higher frequency ranges is less visible to human visual perception than is loss of information in the lower frequency ranges.

The following are Quantization Tables 0–15, according to a preferred embodiment of the present invention. These quantization tables are used to quantize the DCT coefficients produced from DCT transforms applied to a given video image. The quantization tables were designed such that the finest quantization (i.e., Table 15) is at the level of visual perception and the coarsest quantization (i.e., Table 0) produces encoded signals at half the target bit rate.

TABLE 0

| 64 | 64 | 128 | 128 | 256 | 256 | 256 | 512 |
|---|---|---|---|---|---|---|---|
| 64 | 128 | 128 | 256 | 256 | 256 | 512 | 512 |
| 128 | 128 | 256 | 256 | 256 | 512 | 512 | 512 |
| 128 | 256 | 256 | 256 | 512 | 512 | 512 | 1024 |
| 256 | 256 | 256 | 512 | 512 | 512 | 1024 | 1024 |
| 256 | 256 | 512 | 512 | 512 | 1024 | 1024 | 1024 |
| 256 | 512 | 512 | 512 | 1024 | 1024 | 1024 | 1024 |
| 512 | 512 | 512 | 1024 | 1024 | 1024 | 1024 | 1024 |

TABLE 1

| 64 | 64 | 128 | 128 | 128 | 128 | 256 | 256 |
|---|---|---|---|---|---|---|---|
| 64 | 64 | 128 | 128 | 128 | 256 | 256 | 256 |
| 128 | 128 | 128 | 128 | 256 | 256 | 256 | 512 |
| 128 | 128 | 128 | 256 | 256 | 256 | 512 | 512 |
| 128 | 128 | 256 | 256 | 256 | 512 | 512 | 512 |
| 128 | 256 | 256 | 256 | 512 | 512 | 512 | 1024 |
| 256 | 256 | 256 | 512 | 512 | 512 | 1024 | 1024 |
| 256 | 256 | 512 | 512 | 512 | 1024 | 1024 | 1024 |

TABLE 2

| 32 | 64 | 64 | 64 | 128 | 128 | 128 | 128 |
|---|---|---|---|---|---|---|---|
| 64 | 64 | 64 | 128 | 128 | 128 | 128 | 256 |
| 64 | 64 | 128 | 128 | 128 | 128 | 256 | 256 |
| 64 | 128 | 128 | 128 | 128 | 256 | 256 | 256 |
| 128 | 128 | 128 | 128 | 256 | 256 | 256 | 512 |
| 128 | 128 | 128 | 256 | 256 | 256 | 512 | 512 |
| 128 | 128 | 256 | 256 | 256 | 512 | 512 | 512 |
| 128 | 256 | 256 | 256 | 512 | 512 | 512 | 1024 |

TABLE 3

| 32 | 32 | 64 | 64 | 64 | 64 | 128 | 128 |
|---|---|---|---|---|---|---|---|
| 32 | 64 | 64 | 64 | 64 | 128 | 128 | 128 |
| 64 | 64 | 64 | 64 | 128 | 128 | 128 | 128 |
| 64 | 64 | 64 | 128 | 128 | 128 | 128 | 256 |
| 64 | 64 | 128 | 128 | 128 | 128 | 256 | 256 |
| 64 | 128 | 128 | 128 | 128 | 256 | 256 | 256 |
| 128 | 128 | 128 | 128 | 256 | 256 | 256 | 512 |
| 128 | 128 | 128 | 256 | 256 | 256 | 512 | 512 |

TABLE 4

| 32 | 32 | 32 | 64 | 64 | 64 | 64 | 64 |
|---|---|---|---|---|---|---|---|
| 32 | 32 | 64 | 64 | 64 | 64 | 64 | 128 |
| 32 | 64 | 64 | 64 | 64 | 64 | 128 | 128 |
| 64 | 64 | 64 | 64 | 64 | 128 | 128 | 128 |
| 64 | 64 | 64 | 64 | 128 | 128 | 128 | 128 |
| 64 | 64 | 64 | 128 | 128 | 128 | 128 | 256 |
| 64 | 64 | 128 | 128 | 128 | 128 | 256 | 256 |
| 64 | 128 | 128 | 128 | 128 | 256 | 256 | 256 |

TABLE 5

| 16 | 32 | 32 | 32 | 64 | 64 | 64 | 64 |
|---|---|---|---|---|---|---|---|
| 32 | 32 | 32 | 64 | 64 | 64 | 64 | 64 |
| 32 | 32 | 64 | 64 | 64 | 64 | 64 | 64 |
| 32 | 64 | 64 | 64 | 64 | 64 | 64 | 128 |
| 64 | 64 | 64 | 64 | 64 | 64 | 128 | 128 |
| 64 | 64 | 64 | 64 | 64 | 128 | 128 | 128 |
| 64 | 64 | 64 | 64 | 128 | 128 | 128 | 128 |
| 64 | 64 | 64 | 128 | 128 | 128 | 128 | 256 |

TABLE 6

| 16 | 32 | 32 | 32 | 32 | 64 | 64 | 64 |
| 32 | 32 | 32 | 32 | 64 | 64 | 64 | 64 |
| 32 | 32 | 32 | 64 | 64 | 64 | 64 | 64 |
| 32 | 32 | 64 | 64 | 64 | 64 | 64 | 64 |
| 32 | 64 | 64 | 64 | 64 | 64 | 64 | 64 |
| 64 | 64 | 64 | 64 | 64 | 64 | 64 | 128 |
| 64 | 64 | 64 | 64 | 64 | 64 | 128 | 128 |
| 64 | 64 | 64 | 64 | 64 | 128 | 128 | 128 |

TABLE 7

| 16 | 16 | 32 | 32 | 32 | 32 | 64 | 64 |
| 16 | 32 | 32 | 32 | 32 | 64 | 64 | 64 |
| 32 | 32 | 32 | 32 | 64 | 64 | 64 | 64 |
| 32 | 32 | 32 | 64 | 64 | 64 | 64 | 64 |
| 32 | 32 | 64 | 64 | 64 | 64 | 64 | 64 |
| 32 | 64 | 64 | 64 | 64 | 64 | 64 | 64 |
| 64 | 64 | 64 | 64 | 64 | 64 | 64 | 64 |
| 64 | 64 | 64 | 64 | 64 | 64 | 64 | 128 |

TABLE 8

| 16 | 16 | 16 | 32 | 32 | 32 | 32 | 32 |
| 16 | 16 | 32 | 32 | 32 | 32 | 32 | 64 |
| 16 | 32 | 32 | 32 | 32 | 32 | 64 | 64 |
| 32 | 32 | 32 | 32 | 32 | 64 | 64 | 64 |
| 32 | 32 | 32 | 32 | 64 | 64 | 64 | 64 |
| 32 | 32 | 32 | 64 | 64 | 64 | 64 | 64 |
| 32 | 32 | 64 | 64 | 64 | 64 | 64 | 64 |
| 32 | 64 | 64 | 64 | 64 | 64 | 64 | 64 |

TABLE 9

| 8 | 16 | 16 | 16 | 32 | 32 | 32 | 32 |
| 16 | 16 | 16 | 32 | 32 | 32 | 32 | 32 |
| 16 | 16 | 32 | 32 | 32 | 32 | 32 | 32 |
| 16 | 32 | 32 | 32 | 32 | 32 | 32 | 64 |
| 32 | 32 | 32 | 32 | 32 | 32 | 64 | 64 |
| 32 | 32 | 32 | 32 | 32 | 64 | 64 | 64 |
| 32 | 32 | 32 | 32 | 64 | 64 | 64 | 64 |
| 32 | 32 | 32 | 64 | 64 | 64 | 64 | 64 |

TABLE 10

| 8 | 8 | 16 | 16 | 16 | 16 | 32 | 32 |
| 8 | 16 | 16 | 16 | 16 | 32 | 32 | 32 |
| 16 | 16 | 16 | 16 | 32 | 32 | 32 | 32 |
| 16 | 16 | 16 | 32 | 32 | 32 | 32 | 32 |
| 16 | 16 | 32 | 32 | 32 | 32 | 32 | 32 |
| 16 | 32 | 32 | 32 | 32 | 32 | 32 | 64 |
| 32 | 32 | 32 | 32 | 32 | 32 | 64 | 64 |
| 32 | 32 | 32 | 32 | 32 | 64 | 64 | 64 |

TABLE 11

| 8 | 8 | 8 | 8 | 16 | 16 | 16 | 16 |
| 8 | 8 | 8 | 16 | 16 | 16 | 16 | 32 |
| 8 | 8 | 16 | 16 | 16 | 16 | 32 | 32 |
| 8 | 16 | 16 | 16 | 16 | 32 | 32 | 32 |
| 16 | 16 | 16 | 16 | 32 | 32 | 32 | 32 |
| 16 | 16 | 16 | 32 | 32 | 32 | 32 | 32 |
| 16 | 16 | 32 | 32 | 32 | 32 | 32 | 32 |
| 16 | 32 | 32 | 32 | 32 | 32 | 32 | 32 |

TABLE 12

| 8 | 8 | 8 | 8 | 8 | 8 | 16 | 16 |
| 8 | 8 | 8 | 8 | 8 | 16 | 16 | 16 |
| 8 | 8 | 8 | 8 | 16 | 16 | 16 | 16 |
| 8 | 8 | 8 | 16 | 16 | 16 | 16 | 16 |
| 8 | 8 | 16 | 16 | 16 | 16 | 16 | 16 |
| 8 | 16 | 16 | 16 | 16 | 16 | 16 | 32 |
| 16 | 16 | 16 | 16 | 16 | 16 | 32 | 32 |
| 16 | 16 | 16 | 16 | 16 | 32 | 32 | 32 |

TABLE 13

| 8 | 8 | 8 | 8 | 8 | 8 | 8 | 8 |
| 8 | 8 | 8 | 8 | 8 | 8 | 8 | 16 |
| 8 | 8 | 8 | 8 | 8 | 8 | 16 | 16 |
| 8 | 8 | 8 | 8 | 8 | 16 | 16 | 16 |
| 8 | 8 | 8 | 8 | 16 | 16 | 16 | 16 |
| 8 | 8 | 8 | 16 | 16 | 16 | 16 | 16 |
| 8 | 8 | 16 | 16 | 16 | 16 | 16 | 16 |
| 8 | 16 | 16 | 16 | 16 | 16 | 16 | 32 |

TABLE 14

| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 16 |
| 8 | 8 | 8 | 8 | 8 | 8 | 16 | 16 |
| 8 | 8 | 8 | 8 | 8 | 16 | 16 | 16 |
| 8 | 8 | 8 | 8 | 16 | 16 | 16 | 16 |

TABLE 15

| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |
| 8 | 8 | 8 | 8 | 8 | 8 | 8 | 8 |

As described above, when higher quantization levels are used, visible quantization artifacts such as blockiness along the boundaries of the (8×8) boundaries become more observable in the decoded video image. One way to decrease the visibility of such quantization artifacts in the unencoded video image is to apply filter 303 to the source image before it is transformed and quantized by encoder 304. Filter 303 is a low-pass filter which reduces the high-frequency content of the video image to be encoded, thereby trading quantization artifacts for lack of sharpness. In alternative preferred embodiments the functions of filter 303 may be performed in the subsampling stage 302.

Filter 303 may be a linear low-pass filter whose cut-off frequency is varied. In alternative preferred embodiments, filter 303 may also be a non-linear noise reduction filter, also referred to as a non-linear weighted median filter. For example, one such filter examines the eight pixels surrounding the pixel to be filtered. The highest and lowest values, H and L, are found. If the value V of the pixel is greater than H, then V is replaced by $((M-S)*V+S*H)/M$, where S is the strength of the filter, ranging from 0 (weakest) to M (maximum). If the value V of the pixel is lower than L, then V is replaced by $((M-S)*V+S*L)/M$.

Alternatively, linear N-tap low-pass filters may be used in which a pixel's current value is replaced by a weighted average of its own value and the value of a number of surrounding pixels. For computational efficiency such filters are often separable, i.e. they are applied first in a horizontal direction, and then in a vertical direction. For example, in a simple 3-tap 1-2-1 low-pass filter, pixel $P_0$ is filtered by replacing its current value $P_0$ with:

$$P_{0\ (new)} = (1*P_{-1} + 2*P_0 + 1*P_1)/4,$$

where $P_{-1}$ is the value of the pixel to the left of $P_0$ and $P_1$ is the value of the pixel to the right of $P_0$. For 3-tap filters the filter tap ratio may be defined as the ratio of the center tap to other taps, in this case 2:1. It will be appreciated by those skilled in the art that the higher the filter tap ratio, the weaker the strength S of the low-pass tap filter, and vice-versa. Thus, in order to increase the strength S of a tap filter, the filter tap ratio is decreased.

In further alternative preferred embodiments, filter 303 may be a combination of linear and non-linear low pass filters. It will be understood by those skilled in the art that although filter 303 as described above is a spatial low-pass filter, filter 303 may utilize temporal low-pass filtering as well, in which pixels of temporally adjacent frames are utilized to filter pixels in a current video image frame.

Thus, in a preferred embodiment, filter 303 is a variable low-pass filter whose strength S may be selected by rate controller 306. A higher strength S results in a less sharp image with more high frequency information filtered out of the image to be transformed and quantized. In the general case filter 303 removes both high spatial frequencies and high temporal frequencies.

As described above, the quantization level may be varied to control the bit rate. In the present invention, however, filter 303 is also available as an extra parameter or way to control the bit rate of the encoded bitstream. When rate controller 303 is to compress the bitstream by a certain amount in order to achieve a given compression ratio or bit rate for the current video image 301, it may filter the image by a selected strength S using filter 303 and further compress the bitstream utilizing quantization via encoder 304. However, because low-pass filter 303 removes some of the high-frequency components of the blocks of video image, a given (8×8) transform block of DCT coefficients tends to have lower values in the lower right portion of the transform block, and may thus be encoded with fewer bits using, for example, run-length encoding. In this case, a given compression ratio can be achieved using finer quantization levels, since coarse quantization is not necessary to reduce more of the DCT coefficients to zeros. Without the presence of filter 303 to remove some of the high-frequency information in a video image, the high-frequency DCT coefficients would tend to be higher, requiring a coarser quantization level to achieve the target bit rate, which results in worse quantization artifacts. Filter 303 allows a finer quantization level to be used so that decompressed image quality is improved and quantization artifacts are minimized, at the expense of some reduction in sharpness because of the filtering of low-pass filter 303.

Thus, where a finer quantization level is desired rate controller 306 can increase the strength S of low-pass filter 303 and decrease the quantization level of encoder 304 to achieve a given bit rate. If a coarser quantization level can be tolerated for a given image, rate controller 306 can decrease the strength S of low-pass filter 303 and increase the quantization level of encoder 304. Additionally, when a particularly complex video image is to be compressed, both the strength S of low-pass filter 303 and the quantization level of encoder 304 may be increased to achieve the targeted average bit rate in order to avoid skipping or losing frames.

It will be understood that, as described above, when each image to be compressed is part of a sequence of a plurality of video frames representing a motion video, the feedback from buffer 305 and encoder 304 given to rate controller 306, as illustrated in FIG. 3, gives rate controller 306 information concerning the number of bits in the encoded bitstream for the previous frame. Rate controller 306 uses this information to select the quantization level of encoder 304 as well as the strength S of filter 303 for the next frame. It will be understood that this implementation involves an assumption that a current frame is similar to the previous frame so that information concerning the previous frame may be utilized to predict how to encode the current frame. In this manner, encoding system 100 may utilize a low-pass filter 303 (which may be implemented within capture processor 104 or pixel processor 106) to control the bit rate of the output bitstream representing compressed video frames.

Encoding system 100 may also select the filter strength S of filter 303 depending upon the quality of a given image. If a given image is of high quality such that a low average quantization level would be needed for the image, then the image quality may be judged to be good and a low strength filter is applied to the image before quantization. As the quantization level rises, the strength S of filter 303 increases. For example, using a tap filter having a filter tap ratio, as described above, the filter tap ratio will decrease (i.e. strength S of the filter will increase) as the average quantization level rises, as illustrated in the following typical values:

| Average Quantizer Scale | Filter Tap Ratio |
|---|---|
| 4 | 14 |
| 6 | 6 |
| 8 | 2 |
| 10 | 1.5 |
| 12 | 1.0 |

The following filter parameters have also been found to be useful in real-time rate control:

TABLE 16

| T0 | T1 | DIVISOR | RATIO |
|---|---|---|---|
| 6 | 5 | 16 | 1.2 |
| 14 | 9 | 32 | 1.6 |
| 2 | 1 | 4 | 2 |
| 18 | 7 | 32 | 2.6 |
| 10 | 3 | 16 | 3.3 |
| 22 | 5 | 32 | 4.4 |
| 6 | 1 | 8 | 6 |
| 26 | 3 | 32 | 8.7 |
| 14 | 1 | 16 | 14 |
| 30 | 1 | 32 | 30 |

TABLE 17

| T0 | T1 | DIVISOR | RATIO |
|---|---|---|---|
| 22 | 21 | 64 | ≈1 |
| 2 | 1 | 4 | 2 |
| 38 | 13 | 64 | ≈3 |
| 42 | 11 | 64 | ≈4 |
| 46 | 9 | 64 | ≈5 |
| 6 | 1 | 8 | 6 |
| 50 | 7 | 64 | ≈7 |
| 26 | 3 | 32 | 8.7 |

TABLE 17-continued

| T0 | T1 | DIVISOR | RATIO |
|----|----|---------|-------|
| 54 | 5  | 64      | ≈11   |
| 14 | 1  | 16      | 14    |
| 58 | 3  | 64      | ≈19   |
| 30 | 1  | 32      | 30    | where: T0 is the weight of the center tap; T1 is the weight of each outer tap; Divisor is the sum of the weights; and Ratio is the filter tap ratio. The tap weights in the preceding tables were selected to give a range of Ratio values while maintaining the sum of the weights as a power of two. Maintaining the sum at a power of two allows an efficient software of hardware implementation of the variable filter. In a practical implementation a fixed number of filter strengths would be allowed such as those in Table 16 or Table 17. Table 16 has a set of approximately logarithmically spaced values using a maximum divisor of 32. Table 17 contains additional ratios but has a maximum divisor of 64.

In the preferred embodiment some calibration is required to establish the method of changing the strength of the filter and the quantization tables in order to produce the best quality. Some typical video sequences are selected and then encoded at fixed quantization levels and with a set of fixed filters.

Figure 4:
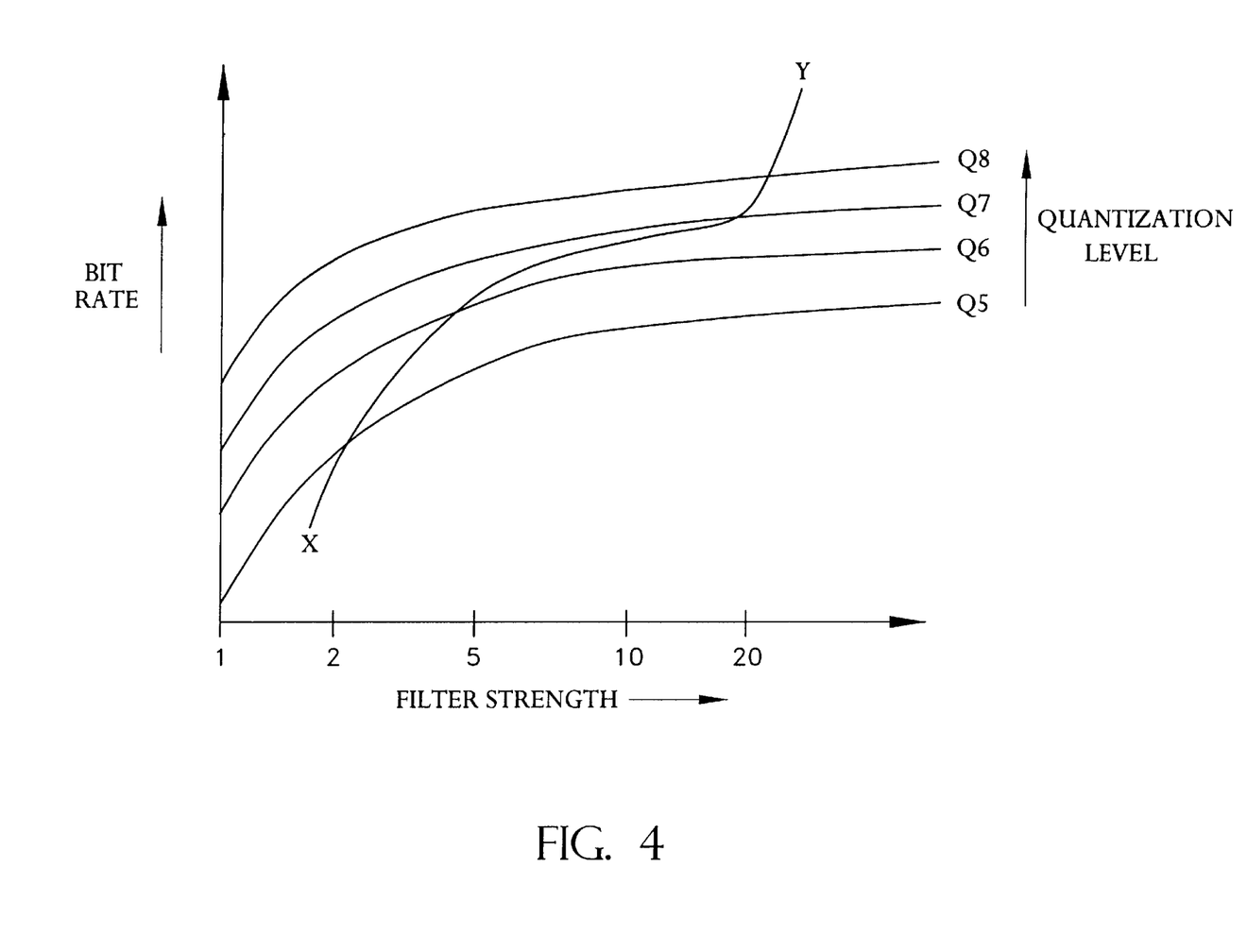
FIG. 4 is a graph plotting bit rate versus filter strength for various quantization levels.

Referring now to FIG. 4, there is shown a graph plotting bit rate versus filter strength for various quantization levels, which is constructed accordingly. At each bit rate a subjective viewing test is performed to determine the particular combination of filter strength and quantizer table that gives the best quality. This may produce a curve similar to that shown as X-Y in FIG. 4. The curve is averaged for several sequences, then entered into a table such as Table 18, below, for use by rate controller 306.

TABLE 18

Example Rate Control Table

| Quantization Table | Filter Strength |
|--------------------|-----------------|
| 0  | 1    |
| 1  | 1.6  |
| 2  | 2    |
| 3  | 2.6  |
| 4  | 3.3  |
| 5  | 4    |
| 6  | 4.4  |
| 7  | 5    |
| 8  | 6    |
| 9  | 7    |
| 10 | 8.7  |
| 11 | 11   |
| 12 | 14   |
| 13 | 19   |
| 14 | 30   |
| 15 | none |
| 16 | none |

Table 18 contains a selected filter strength for each quantization table. The filter strengths relate to the ratios of 3-tap low-pass linear filters.

In an alternative preferred embodiment of the present invention, filter 303 may be utilized to control the bitstream size for still images in a non-motion video environment. Instead of utilizing feedback concerning previous frames to select the strength S of filter 303, each still image to be encoded may be iteratively encoded using a number of different filter strengths until an encoded bitstream is achieved with a specified number or range of bits. This embodiment may not always be able to be implemented in real-time, but may still constitutes a method to select a given compression ratio or encoded bitstream size other than by merely increasing the quantization level. This embodiment may be suitable in situations where each frame is independent of other frames, such as a slide show of multiple independent images. This embodiment may also be suitable for motion video frames to achieve a given encoded bitstream size for each video frame, where a processor is fast enough to iteratively and independently determine the optimum filter strength S for each frame, or where such processing may be performed in non-real-time off-line.

In a further alternative preferred embodiment, a population of images may be analyzed to determine average characteristics of the population. In this usage, filter 303 may be applied off-line to many of the images of the population to determine the average number of bits in the resulting encoded bitstream for a given filter strength S. Then, when compressing some of the video images from the population, either in real-time or in non-real-time, instead of using the feedback or iterative methods described above to determine filter strength S, a given filter strength S will be selected by a rate controller depending upon what size encoded bitstream is to be attained and depending upon the average characteristics of the population of video images.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for encoding image signals, comprising the steps of:
   (a) receiving an image signal comprising a video frame of a plurality of video frames;
   (b) selecting a strength S of a variable low-pass filter means having a variable strength, wherein S is selected in accordance with a predetermined target bitstream size, with the size of an encoded bitstream of a previous video frame of the plurality of video frames, and with a quantization level;
   (c) applying the low-pass filter means at strength S to the image signal; and
   (d) encoding the filtered image signal to provide an encoded bitstream representative of the current image signal, said encoding comprising the steps of:
      (1) performing a discrete cosine transform on the image signal to provide a transformed image signal;
      (2) quantizing the transformed image signal at the quantization level; and
      (3) run-length encoding the quantized transformed image signal to provide the encoded bitstream; and
      (4) determining the quantization level before the quantizing of step (d)(2) in accordance with the predetermined target bitstream size and with the size of the encoded bitstream of the previous image signal.

2. The computer-implemented method of claim 1, wherein the low-pass filter means comprises a linear low-pass filter, wherein S corresponds to the frequency response of the filter.

3. The computer-implemented method of claim 1, wherein the low-pass filter means comprises a non-linear weighted median filter, wherein S corresponds to the weights of the filter.

4. The computer-implemented method of claim 3, further comprising the step of:

(e) digitizing and subsampling the image signal before applying the variable filter to the image signal.

5. The computer-implemented method of claim 4, wherein the variable filter further comprises a spatial non-linear low-pass tap filter.

6. The computer-implemented method of claim 1, wherein the low-pass filter means comprises a linear low-pass filter, wherein S corresponds to the frequency response of the filter.

7. The computer-implemented method of claim 1, wherein the low-pass filter means comprises a non-linear weighted median filter, wherein S corresponds to the weights of the filter.

8. The computer-implemented method of claim 1, wherein the low-pass filter means comprises a spatial low-pass filter.

9. The computer-implemented method of claim 1, wherein the low-pass filter means comprises a temporal low-pass filter.

10. The computer-implemented method of claim 1, wherein the low-pass filter means comprises a combination of spatial and temporal low-pass filters.

11. The computer-implemented method of claim 1, further comprising the step of:
(e) digitizing and subsampling the image signal before applying the variable low-pass filter means to the image signal.

12. An apparatus for encoding image signals, comprising:
(a) means for receiving an image signal comprising a video frame of a plurality of video frames;
(b) means for selecting a strength S of a variable low-pass filter means having a variable strength, wherein S is selected in accordance with a predetermined target bitstream size, with the size of an encoded bitstream of a previous video frame of the plurality of video frames, and with a quantization level;
(c) means for applying the low-pass filter means at strength S to the image signal; and
(d) means for encoding the filtered image signal to provide an encoded bitstream representative of the current image signal, said means for encoding comprising:
(1) means for performing a discrete cosine transform on the image signal to provide a transformed image signal;
(2) means for quantizing the transformed image signal at a quantization level;
(3) means for run-length encoding the quantized transformed image signal to provide the encoded bitstream; and
(4) means for determining the quantization level before the quantizing of means (d)(2) in accordance with the predetermined target bitstream size and with the size of the encoded bitstream of the previous video frame of the plurality of video frames.

13. The apparatus of claim 12, wherein the low-pass filter means comprises a linear low-pass filter, wherein S corresponds to the frequency response of the filter.

14. The apparatus of claim 12, wherein the low-pass filter means comprises a non-linear weighted median filter, wherein S corresponds to the weights of the filter.

15. The apparatus of claim 12, wherein the low-pass filter means comprises a spatial low-pass filter.

16. The apparatus of claim 12, wherein the low-pass filter means comprises a temporal low-pass filter.

17. The apparatus of claim 12, wherein the low-pass filter means comprises a combination of spatial and temporal low-pass filters.

18. The apparatus of claim 12, further comprising:
(e) means for digitizing and subsampling the image signal before applying the variable low-pass filter means to the image signal.

19. The apparatus of claim 12, wherein the low-pass filter means comprises a linear low-pass filter, wherein S corresponds to the frequency response of the filter.

20. The apparatus of claim 12, wherein the low-pass filter means comprises a non-linear weighted median filter, wherein S corresponds to the weights of the filter.

21. The apparatus of claim 20, further comprising:
(e) means for digitizing and subsampling the image signal before applying the variable filter to the image signal.

22. The apparatus of claim 21, wherein the variable filter further comprises a spatial non-linear low-pass tap filter.

23. The apparatus of claim 22, wherein the apparatus is electrically connected to a bus and the bus is electrically connected to a memory device.

24. A computer system, comprising:
an input device which generates an image signal comprising a video frame of a plurality of video frames;
a storage device having stored therein a plurality of instructions for generating a bitstream representative of the image signal; and
a processor coupled to the input device and to the storage device for executing the plurality of instructions; wherein:
(a) a strength S of a variable-strength low-pass filter is selected in accordance with a predetermined target bitstream size, with the size of an encoded bitstream of a previous video frame of the plurality of video frames, and with a quantization level;
(b) the low-pass filter is applied at strength S to the image signal to provide a filtered image signal; and
(c) the filtered image signal is encoded to provide the bitstream, wherein the filtered image signal is encoded by:
(1) performing a discrete cosine transform on the image signal to provide a transformed image signal;
(2) quantizing the transformed image signal at a quantization level;
(3) run-length encoding the quantized transformed image signal to provide the encoded bitstream; and
(4) determining the quantization level in accordance with the predetermined target bitstream size and with the size of the encoded bitstream of the previous video frame of the plurality of video frames.

25. The computer system of claim 24, wherein:
(d) the image signal is digitized and subsampled before the low-pass filter is applied to the image signal.

* * * * *